US010259471B2

(12) United States Patent
Sato et al.

(10) Patent No.: US 10,259,471 B2
(45) Date of Patent: Apr. 16, 2019

(54) VEHICLE

(71) Applicant: Toyota Jidosha Kabushiki Kaisha, Toyota-shi Aichi-ken (JP)

(72) Inventors: Kunihito Sato, Mishima (JP); Kentaro Ichikawa, Shizuoka-ken (JP); Taisuke Sugaiwa, Susono (JP); Maiko Hirano, Susono (JP); Bunyo Okumura, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/591,939

(22) Filed: May 10, 2017

(65) Prior Publication Data

US 2017/0334458 A1 Nov. 23, 2017

(30) Foreign Application Priority Data

May 20, 2016 (JP) ................. 2016-101214

(51) Int. Cl.
*B60R 11/04* (2006.01)
*G01S 19/13* (2010.01)
(Continued)

(52) U.S. Cl.
CPC .......... *B60W 50/12* (2013.01); *B60W 50/082* (2013.01); *G05D 1/0061* (2013.01); *G05D 1/0088* (2013.01); *G05D 1/0214* (2013.01); *B60R 11/04* (2013.01); *B60W 2540/10* (2013.01); *B60W 2540/12* (2013.01); *B60W 2540/18* (2013.01); *B60W 2540/22* (2013.01);
(Continued)

(58) Field of Classification Search
CPC ......... B60W 2540/10; B60W 2540/12; B60W 2540/18; B60W 2540/22; B60W 2900/00; B60R 11/04; G01S 19/13; G05D 50/08; G05D 50/082; G05D 50/12; G05D 1/00; G05D 1/0061; G05D 1/0088; G05D 1/0214; G05D 1/0236; G05D 1/0257
USPC ......................................... 701/23
See application file for complete search history.

(56) References Cited

U.S. PATENT DOCUMENTS 8,260,482 B1 9/2012 Szybalski et al.
8,670,891 B1 3/2014 Szybalski et al.
(Continued)

FOREIGN PATENT DOCUMENTS

JP H1254432 A 10/1989
JP H9240502 A 9/1997
(Continued)

*Primary Examiner* — Atul Trivedi
(74) *Attorney, Agent, or Firm* — Dinsmore & Shohl LLP

(57) ABSTRACT

A vehicle includes an autonomous driving device that executes autonomous drive control; a track generation section that generates a travel track of the vehicle based on an estimation result by a self-position estimation section and a recognition result by an object recognition section; an actuator that moves the vehicle so that the vehicle travels along the travel track; a trigger input pedal disposed at a left side from an accelerator pedal and a brake pedal 102, seen from a driver; and an autonomous drive control start determination section that starts the autonomous drive control when an autonomous drive control start trigger is inputted via the trigger input pedal and it is determined that start of the autonomous drive control is possible.

8 Claims, 6 Drawing Sheets

(51) Int. Cl.
- *B60W 50/08* (2012.01)
- *B60W 50/12* (2012.01)
- *G05D 1/00* (2006.01)
- *G05D 1/02* (2006.01)

(52) U.S. Cl.
CPC .......... *B60W 2900/00* (2013.01); *G01S 19/13* (2013.01); *G05D 1/0236* (2013.01); *G05D 1/0257* (2013.01)

(56) References Cited

U.S. PATENT DOCUMENTS

| | | | |
|---|---|---|---|
| 2007/0198145 A1* | 8/2007 | Norris | B60T 7/22 701/23 |
| 2015/0185034 A1* | 7/2015 | Abhyanker | G01C 21/36 701/23 |
| 2015/0210272 A1* | 7/2015 | Edgren | G08B 6/00 701/23 |
| 2015/0346724 A1* | 12/2015 | Jones | B60W 30/12 701/23 |
| 2016/0207538 A1* | 7/2016 | Urano | B60W 30/182 |
| 2017/0003681 A1* | 1/2017 | Ross | B60W 50/029 |
| 2017/0010613 A1 | 1/2017 | Fukumoto | |
| 2017/0090480 A1* | 3/2017 | Ho | G05D 1/0214 |
| 2017/0315550 A1* | 11/2017 | Ichikawa | G05D 1/0061 |
| 2018/0057006 A1* | 3/2018 | Seki | B60W 10/08 |
| 2018/0194356 A1* | 7/2018 | Richards | B60W 30/20 |
| 2018/0202822 A1* | 7/2018 | DeLizio | G01C 21/3438 |

FOREIGN PATENT DOCUMENTS

| | | |
|---|---|---|
| JP | H11091397 A | 4/1999 |
| JP | 2001-199327 A | 7/2001 |
| JP | 2014106854 A | 6/2014 |
| JP | 201524746 A | 2/2015 |
| JP | 2015-063244 A | 4/2015 |
| JP | 2015-158467 A | 9/2015 |
| WO | 2016067594 A1 | 5/2016 |

\* cited by examiner

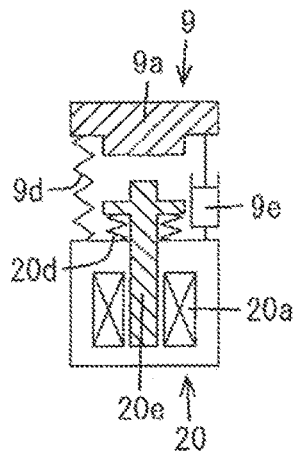
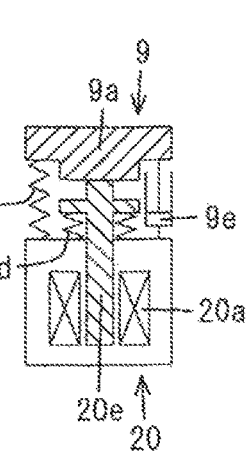
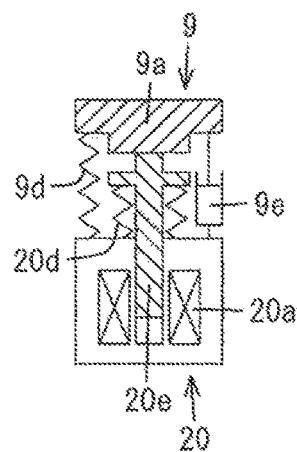
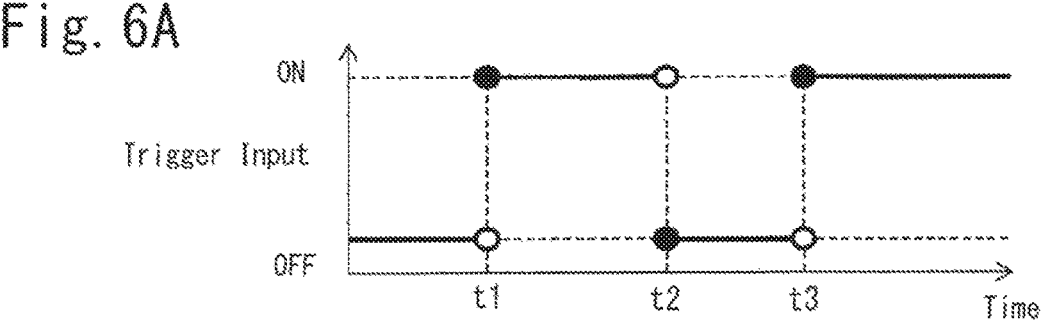
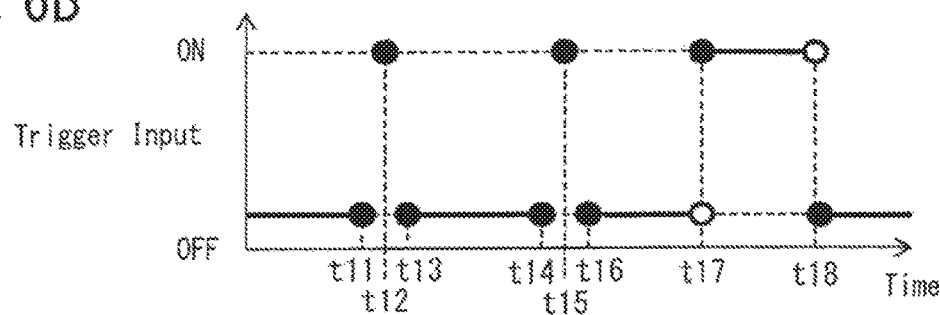

VEHICLE

CROSS-REFERENCE TO RELATED APPLICATIONS

The present application claims priority under 35 U.S.C. § 119 to Japanese Patent Application No. 2016-101214, filed May 20, 2016, the contents of which are incorporated herein by reference in the entirety.

BACKGROUND

Technical Field

Embodiments of the present disclosure relate to a vehicle having an autonomous driving device.

Background Art

Conventionally, a vehicle in which autonomous drive control is executed has been known. As an example of this kind of vehicle, there is the vehicle described in Patent Literature 1 shown below, for example.

Patent Literature 1 indicates that autonomous drive control is started when an autonomous drive start button is pressed down under a situation in which the vehicle travels by manual drive. Further, Patent Literature 1 indicates that the autonomous drive start button is one of various buttons loaded on the vehicle.

That is, the autonomous drive start button described in Patent Literature 1 is considered to be operated by the hand of a driver (a user). That is to say, in the vehicle described in Patent Literature 1, an autonomous drive control start trigger is inputted by the hand of a driver via the autonomous drive start button, during manual drive.

LIST OF RELATED ART

Following is a list of patent literatures which the applicant has noticed as related arts of the present disclosure.
[Patent Literature 1]
  Japanese Patent Laid-Open No. 2015-158467

Problem to be Solved by Embodiments of the Present Disclosure

Usually, a steering operation in manual drive is executed by the hands of a driver.

Consequently, in the vehicle described in Patent Literature 1, input of the autonomous drive control start trigger via the autonomous drive start button is performed by the hands of the driver under manual drive in addition to a steering operation. As a result, in the vehicle described in Patent Literature 1, a disturbance in a steering operation is likely to occur at the time of input of the autonomous drive control start trigger.

Further, an accelerator operation or a brake operation in manual drive is usually performed by the right foot of the driver.

Consequently, if input of the autonomous drive control start trigger is carried out by the driver in addition to an accelerator operation or a brake operation by the right foot of the driver under manual drive, disturbance in the accelerator operation or the brake operation is likely to occur at the time of the input of the autonomous drive control start trigger.

When a disturbance in the steering operation, the accelerator operation or the brake operation occurs at the time of input of the autonomous drive control start trigger, a behavior of the vehicle is likely to be disturbed.

Further, when input of the autonomous drive control start trigger via the autonomous drive start button is carried out by the hand of the driver under manual drive, a posture of the driver changes as the sight line of the driver moves to the autonomous drive start button, as a result of which, there arises the fear that the accelerator operation or the brake operation by the driver becomes discontinuous, and the behavior of the vehicle is disturbed.

In the light of the above described problem, it is an object of an embodiment of the present disclosure to provide a vehicle that can suppress a disturbance in a behavior of the vehicle at a time when an autonomous drive control start trigger is inputted.

Furthermore, it is an object of an embodiment of the present disclosure to provide a vehicle that can suppress a disturbance in the behavior of the vehicle immediately after an end of the autonomous drive control.

SUMMARY

To achieve the above mentioned purpose, a first aspect of an embodiment of the present disclosure is a vehicle comprising an accelerator pedal, a brake pedal and an autonomous driving device that executes autonomous drive control of the vehicle, wherein the autonomous driving device comprises:
  a self-position estimation section;
  an object recognition section;
  a track generation section that generates a travel track of the vehicle based on an estimation result by the self-position estimation section and a recognition result by the object recognition section;
  an actuator that moves the vehicle so that the vehicle travels along the travel track generated by the track generation section;
  an autonomous drive control start trigger input pedal that is disposed at a left side from the accelerator pedal and the brake pedal, seen from a driver; and
  an autonomous drive control start determination section that starts the autonomous drive control when an autonomous drive control start trigger is inputted via the autonomous drive control start trigger input pedal by the driver under a situation where the autonomous driving device determines that start of the autonomous drive control is possible.

According to the first aspect, the autonomous drive control start trigger is not inputted via the autonomous drive start button by the hand of the driver performing the steering operation under the manual drive as in the vehicle described in Patent Literature 1, but is inputted via the autonomous drive control start trigger input pedal by a left foot of the driver that does not participate in any of the steering operation, the accelerator operation and the brake operation under the manual drive. Consequently, in the vehicle of the present aspect, a disturbance in the steering operation at the time of inputting the autonomous drive control start trigger can be suppressed more than in a case where the autonomous drive control start trigger is inputted by the hand of the driver performing the steering operation under the manual drive. Further, the disturbance in the accelerator operation or the brake operation at the time of inputting the autonomous drive control start trigger can be suppressed more than in a case where the autonomous drive control start trigger is inputted by a right foot of the driver performing the accelerator operation or the brake operation under the manual drive, too.

Further, the vehicle of the present aspect reduces the possibility that the accelerator operation or the brake operation by the driver becomes discontinuous, and the behavior of the vehicle is disturbed more than in the case where the autonomous drive control start trigger is inputted by the hand of the driver under manual drive. As a result, the vehicle of the present aspect can suppress the disturbance in the behavior of the vehicle, which is caused by a disturbance in the steering operation, the accelerator operation or the brake operation at the time of inputting the autonomous drive control start trigger. In other words, in the vehicle of the present aspect, the autonomous drive control can be started without disturbing the behavior of the vehicle even when the steering operation and the accelerator operation or the brake operation are performed by the driver.

A second aspect of an embodiment of the present disclosure is the vehicle according to the first aspect discussed above, wherein the autonomous driving device further comprises:

a driver state estimation section that estimates a state of the driver; and a driver state determination section that determines whether or not the state of the driver estimated by the driver state estimation section is suitable for start of the autonomous drive control, and wherein the autonomous drive control start determination section starts the autonomous drive control, when the driver state determination section determines that the state of the driver is suitable for start of the autonomous drive control and the autonomous drive control start trigger is inputted via the autonomous drive control start trigger input pedal by the driver, under a situation where the autonomous driving device determines that start of the autonomous drive control is possible.

According to the second aspect, the autonomous drive control is not started, unless the driver state determination section determines that the state of the driver is suitable for start of the autonomous drive control, even when it is determined by the autonomous driving device that the autonomous drive control can be started, and the autonomous drive control start trigger is inputted via the autonomous drive control start trigger input pedal by the driver. Consequently, the vehicle of the present aspect can reduce the possibility that the autonomous drive control is started when the autonomous drive control start trigger is inputted by mistake of the driver. In other words, the vehicle of the present aspect can realize switching of the autonomous drive control and manual drive, in which the desire of the driver is reflected.

A third aspect of an embodiment of the present disclosure is the vehicle according to the second aspect discussed above, wherein the autonomous driving device further comprises a lock mechanism that locks the autonomous drive control start trigger input pedal, and the lock mechanism locks the autonomous drive control start trigger input pedal so that the driver cannot input the autonomous drive control start trigger via the autonomous drive control start trigger input pedal when the driver state determination section determines that the state of the driver is not suitable for start of the autonomous drive control.

According to the third aspect, the autonomous drive control start trigger input pedal is locked when the state of the driver is not suitable for start of the autonomous drive control. Consequently, in the vehicle of the present aspect, the driver can be notified that the driver state determination section determines that the state of the driver is not suitable for start of the autonomous drive control, by the autonomous drive control start trigger input pedal being locked.

A fourth aspect of an embodiment of the present disclosure is the vehicle according to the first aspect discussed above, wherein the autonomous drive control start trigger input pedal also functions as an autonomous drive control end trigger input pedal, and the autonomous driving device further comprises an autonomous drive control end determination section that ends the autonomous drive control when the driver inputs an autonomous drive control end trigger via the autonomous drive control start trigger input pedal, under a situation where the autonomous drive control is executed by the autonomous driving device.

According to the fourth aspect, the autonomous drive control end trigger is not inputted by the hand of the driver, which should perform the steering operation immediately after end of the autonomous drive control (that is, immediately after start of the manual drive), but is inputted via the autonomous drive control start trigger input pedal by the left foot of the driver that should not participate in any of the steering operation, the accelerator operation and the brake operation immediately after the start of the manual drive. Consequently, in the vehicle of the present aspect, a disturbance in the steering operation immediately after the start of the manual drive can be suppressed more than in a case where the autonomous drive control end trigger is inputted by the hand of the driver, which has to perform the steering operation immediately after the start of the manual drive, and a disturbance in the accelerator operation or the brake operation immediately after the start of the manual drive can be suppressed more than in a case where the autonomous drive control end trigger is inputted by the right foot of the driver, which has to perform the accelerator operation or the brake operation immediately after the start of the manual drive. As a result, the vehicle of the present aspect can suppress the disturbance in the behavior of the vehicle, which is caused by a disturbance in the steering operation, the accelerator operation or the brake operation immediately after the end of the autonomous drive control (that is, immediately after the start of the manual drive). In other words, in the vehicle of the present aspect, the driver can execute the steering operation and the accelerator operation or the brake operation without disturbing the behavior of the vehicle immediately after the end of the autonomous drive control.

Further, in the vehicle of the present aspect, the autonomous drive control start trigger input pedal also functions as the autonomous drive control end trigger input pedal. Therefore, the present aspect can reduce cost of the entire vehicle more than in a case where the autonomous drive control start trigger input pedal and the autonomous drive control end trigger input pedal are provided separately.

A fifth aspect of an embodiment of the present disclosure is a vehicle comprising an accelerator pedal, a brake pedal and an autonomous driving device that executes autonomous drive control of the vehicle, wherein the autonomous driving device comprises:

a self-position estimation section, an object recognition section, a track generation section that generates a travel track of the vehicle based on an estimation result by the self-position estimation section and a recognition result by the object recognition section, an actuator that moves the vehicle so that the vehicle travels along the travel track generated by the track generation section, an autonomous drive control end trigger input pedal that is disposed at a left side from the accelerator pedal and the brake pedal, seen from a driver, and an autonomous drive control end determination section that ends the autonomous drive control when an autonomous drive control end trigger is inputted via the autonomous drive control end trigger input pedal by the driver under a situation where the autonomous drive control is executed by the autonomous driving device.

According to the fifth aspect discussed above, the autonomous drive control end trigger is not inputted by the hand of the driver, which should perform the steering operation immediately after end of the autonomous drive control (that is, immediately after start of the manual drive), but is inputted via the autonomous drive control end trigger input pedal by the left foot of the driver that does not participate in any of the steering operation, the accelerator operation and the brake operation immediately after the start of the manual drive. Consequently, in the vehicle of the present aspect, a disturbance in the steering operation immediately after the start of the manual drive can be suppressed more than in the case where the autonomous drive control end trigger is inputted by the hand of the driver, which has to perform the steering operation immediately after the start of the manual drive, and a disturbance in the accelerator operation or the brake operation immediately after the start of the manual drive can be suppressed more than in the case where the autonomous drive control end trigger is inputted by the right foot of the driver, which has to perform the accelerator operation or the brake operation immediately after the start of the manual drive. Further, the vehicle of the present aspect can reduce the possibility that the accelerator operation or the brake operation by the driver becomes discontinuous, and the behavior of the vehicle is disturbed, more than in the case where the autonomous drive control end trigger is inputted by the hand of the driver, which has to perform the steering operation immediately after the start of the manual drive. As a result, the vehicle of the present aspect can suppress the disturbance in the behavior of the vehicle, which is caused by a disturbance in the steering operation, the accelerator operation or the brake operation immediately after the end of the autonomous drive control (that is, immediately after the start of the manual drive). In other words, in the vehicle of the present aspect, the driver can perform the steering operation and the accelerator operation or the brake operation without disturbing the behavior of the vehicle immediately after the end of the autonomous drive control.

The autonomous drive control end trigger may be inputted via the autonomous drive control end trigger input pedal by an erroneous operation of the driver during the autonomous drive control, although the driver desires continuation of the autonomous drive control, that is, the driver does not desire start of the manual drive. When the driver desires continuation of the autonomous drive control, there is a high possibility that the driver is not prepared to execute the manual drive.

In the light of the above point, a sixth aspect of and embodiment of the present disclosure is the vehicle according to the fifth aspect discussed above, wherein the autonomous driving device further comprises:

a driver state estimation section that estimates a state of the driver; and a driver state determination section that determines whether or not the state of the driver estimated by the driver state estimation section is suitable for end of the autonomous drive control, and wherein the autonomous drive control end determination section ends the autonomous drive control, when the driver state determination section determines that the state of the driver is suitable for end of the autonomous drive control and the autonomous drive control end trigger is inputted via the autonomous drive control end trigger input pedal by the driver, under a situation where the autonomous drive control is executed by the autonomous driving device.

In the vehicle of the present aspect, the autonomous drive control is not ended, unless the driver state determination section determines that the state of the driver is suitable for end of the autonomous drive control, even when the autonomous drive control end trigger is inputted via the autonomous drive control end trigger input pedal by the driver under a situation where the autonomous drive control is executed by the autonomous driving device. Consequently, the vehicle of the present aspect can reduce the possibility that the autonomous drive control is ended although the driver is not prepared to execute the manual drive.

A seventh aspect of an embodiment of the present disclosure is the vehicle according to the sixth aspect discussed above, wherein the autonomous driving device further comprises a lock mechanism that locks the autonomous drive control end trigger input pedal, and the lock mechanism locks the autonomous drive control end trigger input pedal so that the driver cannot input the autonomous drive control end trigger via the autonomous drive control end trigger input pedal when the driver state determination section determines that the state of the driver is not suitable for end of the autonomous drive control.

According to the seventh aspect discussed above, the autonomous drive control end trigger input pedal is locked when the state of the driver is not suitable for end of the autonomous drive control. Consequently, in the vehicle of the present aspect, it is possible to notify the driver that the driver state determination section determines that the state of the driver is not suitable for end of the autonomous drive control by the autonomous drive control end trigger input pedal being locked.

For example, during the autonomous drive control, the vehicle may travel on a road where the vehicle easily spins out. If the steering intervention by the driver is permitted in such a situation, the risk of the vehicle falling into a spin becomes higher than in a case where the steering intervention by the driver is rejected and the autonomous drive control is continued. In more detail, the risk of the vehicle spinning out becomes high, immediately after the steering intervention by the driver is permitted and the driver starts a steering operation.

From the view point discussed above, an eighth aspect of and embodiment of the present disclosure is the vehicle according to the seventh aspect discussed above, wherein the driver state estimation section estimates steering intervention of the driver in the autonomous drive control;

the autonomous driving device further comprises a risk estimation section that estimates a risk that is caused by steering intervention of the driver in the autonomous drive control; and the lock mechanism locks the autonomous drive control end trigger input pedal so that the driver cannot input the autonomous drive control end trigger via the autonomous drive control end trigger input pedal when the risk estimation section estimates that the risk is present.

According to the eighth aspect discussed above, the autonomous drive control end trigger input pedal is locked, when the risk estimation section estimates that there is a risk caused by steering intervention of the driver in the autonomous drive control. That is, in the vehicle of the present aspect, steering intervention by the driver is rejected and the autonomous drive control is continued, when the risk estimation section estimates that there is the risk discussed above even when the driver desires the steering intervention during the autonomous drive control. Consequently, the vehicle of the present aspect can reduce the possibility that the risk is caused by the steering intervention of the driver under the autonomous drive control.

Advantages of Embodiments of the Present Disclosure

According to the embodiment of the present disclosure, a disturbance in the behavior of the vehicle at the time of inputting the autonomous drive control start trigger can be suppressed.

Furthermore, according to the embodiment of the present disclosure, a disturbance in the behavior of the vehicle immediately after end of the autonomous drive control can be suppressed.

BRIEF DESCRIPTION OF THE DRAWINGS

FIG. 5A shows an another example of a trigger input pedal 9 and a lock mechanism 20 in an unlocked and undepressed state which are applicable to the vehicle 200 according to the first embodiment of the present disclosure;

FIG. 5B shows the another example of a trigger input pedal 9 and a lock mechanism 20 in an unlocked and depressed state which are applicable to the vehicle 200 according to the first embodiment of the present disclosure;

FIG. 5C shows the another example of a trigger input pedal 9 and a lock mechanism 20 in a locked state which are applicable to the vehicle 200 according to the first embodiment of the present disclosure;

FIG. 6A illustrates states in which a trigger is inputted or not via the trigger input pedal 9 shown in FIG. 4A;

FIG. 6B illustrates states in which a trigger is inputted or not via the trigger input pedal 9 shown in FIGS. 5A through 5C;

DETAILED DESCRIPTION

Figure 1:
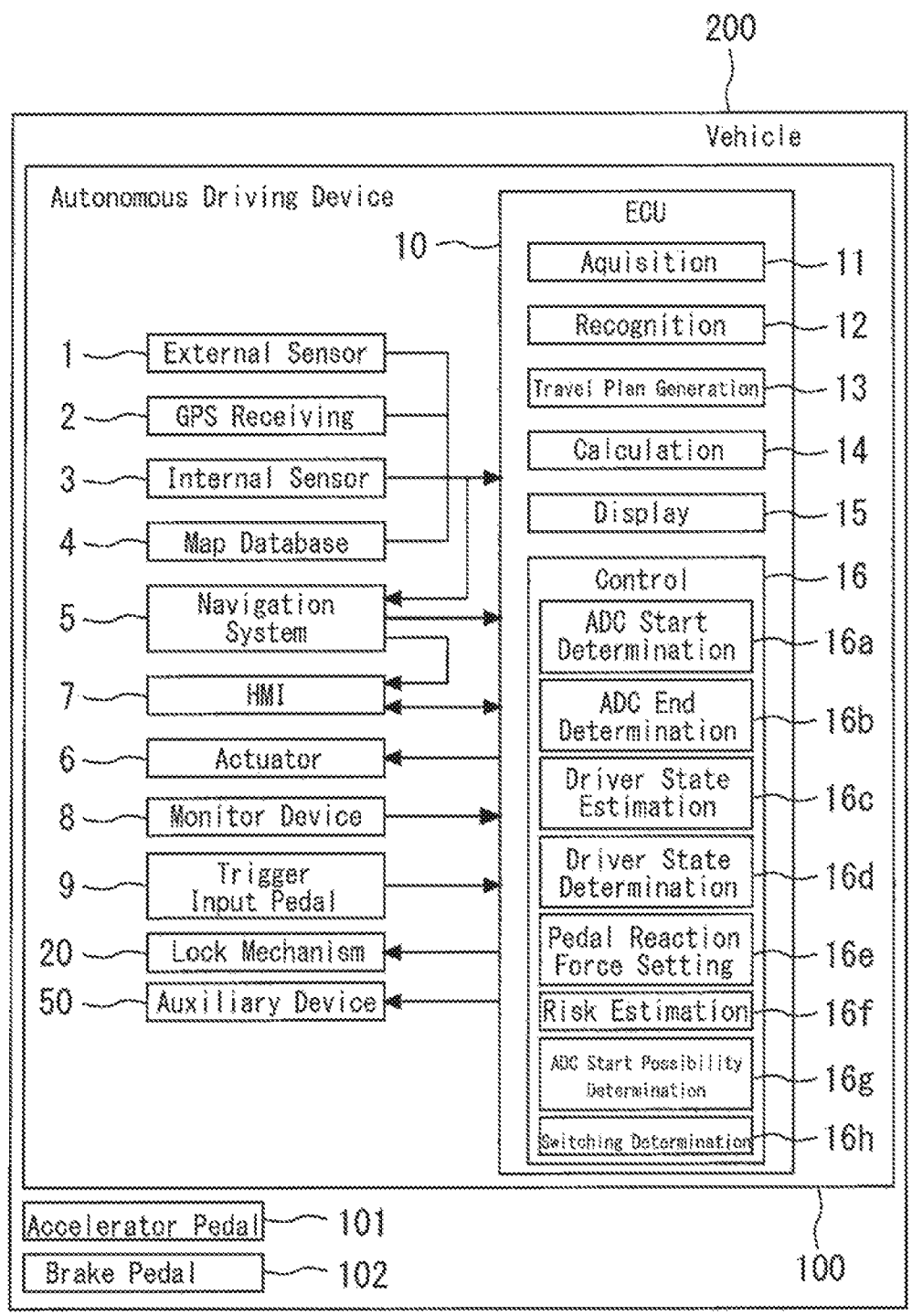
FIG. 1 is a schematic configuration diagram of a vehicle according to a first embodiment of the present disclosure.

Hereinafter, a first embodiment of a vehicle according to the present disclosure will be described. FIG. 1 is a schematic configuration diagram of the vehicle of the first embodiment.

In an example illustrated in FIG. 1, an autonomous driving device 100, an accelerator pedal 101 and a brake pedal 102 are provided in a vehicle 200. In the example illustrated in FIG. 1, the autonomous driving device 100 executes autonomous drive control of the vehicle 200. The autonomous drive control means control under which drive operations such as acceleration, deceleration and steering of the vehicle 200 are carried out without recourse to a drive operation of a driver of the vehicle 200. The autonomous drive control includes lane-keeping assist control, for example. In the lane-keeping assist control, a steering wheel (not illustrated) is automatically steered (that is, without recourse to a steering operation of the driver) so that the vehicle 200 does not deviate from a travel lane. That is, in the lane-keeping assist control, the steering wheel is automatically steered so that the vehicle 200 travels along a travel lane even when the driver does not perform a steering operation, for example. Further, the autonomous drive control also includes cruise control, for example. In the cruise control, constant speed control that causes the vehicle 200 to perform constant-speed travel at a speed set in advance is executed when no preceding car is present ahead of the vehicle 200, and when a preceding car is present ahead of the vehicle 200, tracking control that adjusts a vehicle speed of the vehicle 200 in accordance with a following distance from the preceding vehicle is executed, for example.

In the example illustrated in FIG. 1, the autonomous driving device 100 switches autonomous drive control to manual drive, when a comparison target, which is converted into a numeric value is equal to or larger than a threshold value for the manual drive. More specifically, the autonomous driving device 100 switches the autonomous drive control to manual drive when an operation amount of any one of a steering operation, an accelerator operation and a brake operation by a driver of the vehicle 200 under autonomous drive control is equal to or larger than a threshold value. It should be noted that the above operation amount includes a steering workload, too. The aforementioned steering workload is described in detail in JP 2015-063244 A, for example.

The manual drive is a drive state in which the vehicle 200 is mainly controlled by drive operations of a driver. The manual drive may include a drive state in which the vehicle 200 is controlled only by the drive operations of the driver. Further, the manual drive may also include a drive state in which drive operation assist control that assists in the drive operations of the driver is performed while the vehicle 200 is mainly controlled by the drive operations. The case where the drive operation assist control is performed at a time of the manual drive may include a mode in which any of steering, the accelerator operation and the brake operation is mainly controlled by the driver of the vehicle 200, and the autonomous driving device 100 performs any of the steering control, engine control and brake control for which the drive operation by the drive is not performed. Alternatively, such a mode may also include a case in which the drive operation assist control adds or subtracts operation amounts to or from the operation amounts of the driver.

In the example illustrated in FIG. 1, the autonomous driving device 100 includes an external sensor 1, a GPS (Global Positioning System) receiving section 2, an internal sensor 3, a map database 4, a navigation system 5, an actuator 6, a HMI (Human Machine Interface) 7, a monitor device 8, a trigger input pedal 9, a lock mechanism 20, auxiliary equipment 50 and an ECU (electronic control unit) 10.

In the example illustrated in FIG. 1, the external sensor 1 may include a detection equipment that detects an external situation, that is, peripheral information of the vehicle 200. The external sensor 1 includes at least one of a camera, a radar unit and a lidar (Laser Imaging Detection and Ranging) unit.

The camera is an imaging device that picks up an image of the external situation of the vehicle 200. The camera is provided at a back side of a windshield of the vehicle 200, for example. The camera may be a monocular camera or may be a stereo camera. A stereo camera has two image pickup sections that are disposed to reproduce binocular parallax, for example. Image information of the stereo camera also includes information on a depth direction. The camera outputs image information concerning the external situation of the vehicle 200 to the ECU 10. Further, the camera may be not only a visible light camera but also may be an infrared camera.

A radar detects an obstacle outside the vehicle 200 by using radio waves. The radio waves are, for example, millimeter waves. The radar transmits radio waves to surroundings of the vehicle 200, and receives radio waves that are reflected by obstacles to detect the obstacles. The radar can output a distance or a direction to an obstacle, for example, as obstacle information concerning the obstacle. The radar outputs the obstacle information that is detected to the ECU 10. In the case of performing sensor fusion, received information of the reflected radio waves may be outputted to the ECU 10.

The lidar detects obstacles outside the vehicle 200 by using light. The lidar transmits light to surroundings of the vehicle 200, receives light reflected by an obstacle, and thereby measures a distance to a reflection point to detect the obstacle. The lidar can output a distance or direction to the obstacle, for example, as obstacle information. The lidar outputs the obstacle information that is detected to the ECU 10. In the case of performing sensor fusion, received information of the reflected light may be outputted to the ECU 10. The camera, the lidar and the radar do not necessarily have to be equipped together.

In the example illustrated in FIG. 1, the GPS receiving section 2 receives signals from three or more GPS satellites, and acquires positional information indicating a position of the vehicle 200. The positional information includes a latitude and a longitude, for example. The GPS receiving section 2 outputs the positional information of the vehicle 200 that is measured to the ECU 10. In another example, in place of the GPS receiving section 2, another means may be used, that can identify the latitude and the longitude at which the vehicle 200 exists.

In the example illustrated in FIG. 1, the internal sensor 3 includes a detector that detects information corresponding to a travel state of the vehicle 200, and an operation amount (the operation amount includes the aforementioned steering workload) of any of the steering operation, the accelerator operation and the brake operation by the driver of the vehicle 200. The internal sensor 3 includes one or both of a vehicle speed sensor and an IMU (Inertial Measurement Unit) to detect information corresponding to the travel state of the vehicle 200. Further, the internal sensor 3 includes at least one of a steering sensor, an accelerator pedal sensor and a brake pedal sensor in order to detect the operation amount.

The vehicle speed sensor detects a speed of the vehicle 200. As the vehicle speed sensor, for example, a wheel speed sensor is used, which is provided at a wheel of the vehicle 200, a driveshaft that rotates integrally with the wheel, or the like, so as to detect a rotational speed of the wheel. The vehicle speed sensor outputs vehicle speed information (wheel speed information) including the speed of the vehicle 200 to the ECU 10.

The IMU is an inertial measurement unit including a triaxial gyro sensor and an acceleration sensor therein. The gyro sensor detects an angular velocity. The acceleration sensor detects an acceleration of the vehicle 200. The acceleration sensor includes a longitudinal acceleration sensor that detects an acceleration in a longitudinal direction of the vehicle 200, and a lateral acceleration sensor that detects a lateral acceleration of the vehicle 200, for example.

The IMU outputs angular velocity information and acceleration information to the ECU 10.

The steering sensor detects a steering operation amount to the steering wheel (not illustrated) by the driver of the vehicle 200, for example. The steering sensor detects a steering angle or a steering torque, for example, as the steering operation amount. The steering sensor may be attached to a steering shaft (not illustrated) of the vehicle 200, for example. The steering sensor outputs information including the steering angle or the steering torque to the ECU 10.

The accelerator pedal sensor detects a pressing amount on the accelerator pedal 101, for example. The pressing amount on the accelerator pedal 101 is a position (a pedal position) of the accelerator pedal 101 with a predetermined position as a reference, for example. The predetermined position may be a fixed position, or may be a position that is changed in accordance with a predetermined parameter. The accelerator pedal sensor may be provided at a shaft portion of the accelerator pedal 101 of the vehicle 200, for example. The accelerator pedal sensor outputs operation information corresponding to the pressing amount to the ECU 10.

The brake pedal sensor detects a pressing amount on the brake pedal 102, for example. The pressing amount on the brake pedal 102 is a position (a pedal position) of the brake pedal 102 with a predetermined position as a reference, for example. The predetermined position may be a fixed position, or may be a position changed in accordance with a predetermined parameter. The brake pedal sensor is provided at a portion of the brake pedal 102, for example. The brake pedal sensor may detect an operation force exerted on the brake pedal 102 (a pressing force to the brake pedal 102, a pressure of a master cylinder, or the like). The brake pedal sensor outputs operation information corresponding to the pressing amount or the operation force to the ECU 10.

In the example illustrated in FIG. 1, the map database 4 includes map information. The map database 4 is formed in a HDD (Hard Disk Drive) loaded on the vehicle 200, for example. The map information includes positional information of roads, information on road shapes, and positional information of intersection points and branch points, for example. The information on the road shapes includes, for example, curves, types of straight-line sections, curvatures of the curves and the like. Furthermore, when the autonomous driving device 100 uses positional information of shield structures such as buildings or walls, or SLAM (Simultaneous Localization and Mapping) technique, output signals of the external sensor 1 may be included in the map information. In another example, the map database 4 may be stored in a computer of a facility such as an information processing center that is communicable with the vehicle 200.

In the example illustrated in FIG. 1, the navigation system 5 gives a guidance to get to a destination set on a map to the driver of the vehicle 200. The navigation system 5 calculates a route on which the vehicle 200 travels, based on the positional information of the vehicle 200 measured by the GPS receiving section 2 and the map information in the map database 4. In the route, a travel lane on which the vehicle 200 travels in a zone with a plurality of lanes may be specified. The navigation system 5 calculates a target route from the position of the vehicle 200 to the destination. The target route may be notified to the driver by an indication on a display and an audio output from a speaker, for example. The navigation system 5 outputs information on the target route to the ECU 10. In the example illustrated in FIG. 1, the navigation system 5 uses the positional information of the vehicle 200 measured by the GPS receiving section 2 and the map information in the map database 4. In another example, the navigation system 5 may use information that is stored in the computer of the facility such as the information processing center that is communicable with the vehicle 200, instead. Alternatively, part of the processing that is performed by the navigation system 5 may be performed by the computer of the facility.

In the example illustrated in FIG. 1, the actuator 6 is a device that executes travel control of the vehicle 200. The actuator 6 includes at least a throttle actuator, a brake actuator and a steering actuator.

In the example illustrated in FIG. 1, the throttle actuator controls a supply amount (a throttle opening degree) of air to the engine in response to a control signal from the ECU 10 so as to control a drive force of the vehicle 200. In another example in which the vehicle 200 is an electric automobile, the actuator 6 does not include a throttle actuator, but the actuator 6 has a motor as a power source. In this example, the control signal from the ECU 10 is inputted to the motor so that the drive force of the vehicle 200 is controlled.

The brake actuator controls a brake system in response to a control signal from the ECU 10 so as to control a braking force applied to the wheels of the vehicle 200. As the brake system, a hydraulic brake system can be used, for example.

The steering actuator controls an assist motor which generates a steering torque in an electric power steering system, in response to a control signal from the ECU 10. Thereby, the steering actuator controls the steering torque of the vehicle 200.

In the example illustrated in FIG. 1, the HMI 7 is an interface for outputting and inputting information between a passenger (including the driver) of the vehicle 200 and the autonomous driving device 100. The HMI 7 includes a display panel for displaying image information to the passenger, a speaker for audio output, and an operation button, a touch panel or the like for the passenger to perform an input operation, for example. The HMI 7 may outputs the information to the passenger by using a portable information terminal which is connected via radio, and may receive an input operation by the passenger by using the portable information terminal.

In the example illustrated in FIG. 1, the monitor device 8 monitors an action and a state of the driver. The monitor device 8 may be a camera capable of picking up an image of the driver, for example, and is used in estimation of an eye opening degree, a sight line direction, a posture and the like of the driver, for example. Further, the monitor device 8 may be a camera that takes a photo of hands of the driver, for example. In this case, it may be judged whether or not the driver grips a steering wheel (not illustrated), for example, by analyzing the photo. Alternatively, the monitor device 8 may be a touch sensor (a strain sensor) that detects strength of a force with which the steering wheel is gripped as described in JP 11-091397 A, for example. Further, the monitor device 8 may be a seating sensor of a driver seat for detecting a distribution of body pressure of the driver, for example.

In the example illustrated in FIG. 1, the trigger input pedal 9 that should be operated by a left foot of the driver is disposed at a left side of the accelerator pedal 101 and the brake pedal 102, seen from the driver. The driver can input a start trigger for an autonomous drive operation control by pressing the trigger input pedal 9 by the left foot during execution of manual drive. Further, during execution of autonomous drive control, the driver can input an end trigger for the autonomous drive control by pressing the trigger input pedal 9 by the left foot.

In the example illustrated in FIG. 1, the lock mechanism 20 is provided for locking the trigger input pedal 9. In more detail, the lock mechanism 20 can lock the trigger input pedal 9 so that the driver cannot press down the trigger input pedal 9. That is, when the trigger input pedal 9 is locked by the lock mechanism 20 during execution of the manual drive, the driver cannot input the start trigger for an autonomous drive control. Further, when the trigger input pedal 9 is locked by the lock mechanism 20 during execution of the autonomous drive control, the driver cannot input the end trigger for the autonomous drive control. The lock mechanism 20 is controlled by a pedal reaction force setting section 16*e* in a control section 16. When the trigger input pedal 9 is not locked by the lock mechanism 20, a value of a pedal reaction force is set at zero, for example, by the pedal reaction force setting section 16*e*. When the trigger input pedal 9 is locked by the lock mechanism 20, the pedal reaction force is set at a large value by the pedal reaction force setting section 16*e*.

Figure 4A:
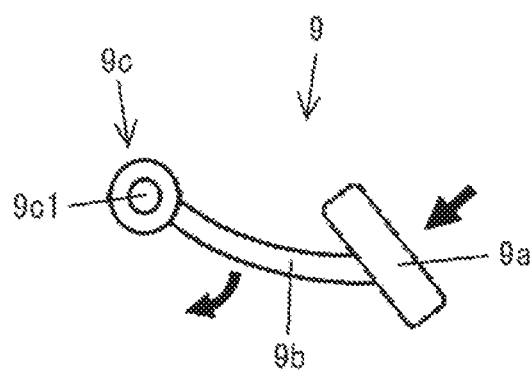
FIG. 4A shows an example of a trigger input pedal 9 which is applicable to the vehicle 200 according to the first embodiment of the present disclosure.
Figure 4B:
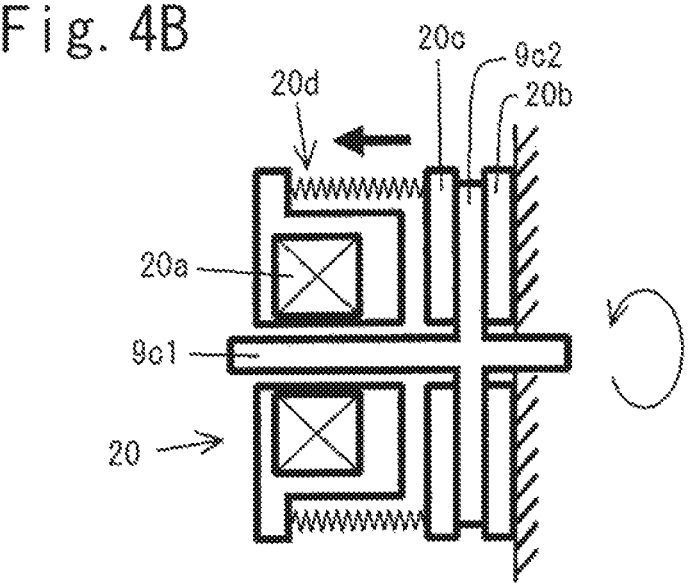
FIG. 4B shows an example of a lock mechanism 20 which is applicable to the vehicle 200 according to the first embodiment of the present disclosure.

FIGS. 4A and 4B illustrates examples of the trigger input pedal 9 and the lock mechanism 20 that can be applied to the vehicle 200 of the first embodiment. In more detail, FIG. 4A illustrates the rotary type trigger input pedal 9. FIG. 4B illustrates the lock mechanism 20 that locks a rotary shaft 9*c*1 of the trigger input pedal 9. In the example illustrated in FIG. 4A, the trigger input pedal 9 is configured by a pedal main body 9*a*, a motor 9*c*, and an arm 9*b* that connects the pedal main body 9*a* and the motor 9*c*. When the pedal main body 9*a* is pressed down by the left foot of the driver, the pedal main body 9*a* and the arm 9*b* rotate clockwise in FIG. 4A. In the examples illustrated in FIG. 4A, a center of rotation of the pedal main body 9*a* and the arm 9*b* is configured by the rotary shaft 9*c*1 of the motor 9*c*. In the example illustrated in FIG. 4B, the lock mechanism 20 is configured by an electromagnetic brake. In the motor 9*c*, a brake lining 9*c*2 is provided. In the example illustrated in FIG. 4B, a movable brake pad 20*c* is pressed to a right side in FIG. 4B by a spring 20*d* when power is not applied to a coil 20*a* of the lock mechanism 20. As a result, the brake lining 9*c*2 is held by the movable brake pad 20*c* and a fixed brake pad 20*b* so that the rotary shaft 9*c*1 cannot rotate, thereby the trigger input pedal 9 is locked. Further, in the example illustrated in FIG. 4B, the movable brake pad 20*c* goes to the left side in FIG. 4B against the spring 20*d* being attracted by an electromagnetic force when power is applied to the coil 20*a* of the lock mechanism 20. As a result, the brake lining 9*c*2 is not held by the movable brake pad 20*c* and the fixed brake pad 20*b*. Thereby, the rotary shaft 9*c*1 becomes rotatable, and lock on the trigger input pedal 9 is cancelled. In the examples illustrated in FIG. 4A, a drive force of the motor 9c is used to rotate the pedal main body 9a and the arm 9b, which are rotated clockwise by pressing by the left foot of the driver, in a counterclockwise direction. In another example, the motor 9c is omitted, and a spring (not illustrated) can be used instead, in order to rotate the pedal main body 9a and the arm 9b which are rotated clockwise by pressing by the left foot of the driver, in the counterclockwise direction.

FIGS. 5A to 5C illustrates other examples of the trigger input pedal 9 and the lock mechanism 20 that can be applied to the vehicle 200 of the first embodiment. In more detail, FIG. 5A illustrates a state where a stroke type trigger input pedal 9 is not locked by the lock mechanism 20, and is not pressed by the driver. FIG. 5B illustrates a state where the trigger input pedal 9 is not locked by the lock mechanism 20, and is pressed down by the left foot of the driver. FIG. 5C illustrates a state where the stroke type trigger input pedal 9 is locked by the lock mechanism 20. In the examples illustrated in FIGS. 5A to 5C, the trigger input pedal 9 is configured by the pedal main body 9a, a spring 9d and a damper 9e. Further, the lock mechanism 20 is configured by a solenoid having a coil 20a, a spring 20d and a plunger 20e. In the examples illustrated in FIGS. 5A and 5B, the plunger 20e is brought into a state where the plunger 20e is attracted to a lower side in FIGS. 5A and 5B by an electromagnetic force against the spring 20d when power is applied to the coil 20a of the lock mechanism 20. In more detail, in the examples illustrated in FIGS. 5A and 5B, the pedal main body 9a moves from a position illustrated in FIG. 5A to a position illustrated in FIG. 5B, when the pedal main body 9a is pressed down by the left foot of the driver, when power is applied to the coil 20a of the lock mechanism 20. Next, when pressing on the pedal main body 9a by the left foot of the driver is cancelled, the pedal main body 9a is returned to the position illustrated in FIG. 5A from the position illustrated in FIG. 5B by the spring 9d. That is, when power is applied to the coil 20a of the lock mechanism 20, the trigger input pedal 9 is brought into a state where the trigger input pedal 9 is not locked by the lock mechanism 20. As shown in FIG. 5C, the plunger 20e is pressed to an upper side in FIG. 5C by the spring 20d, and is brought into a state where the plunger 20e is protruded to an upper side in FIG. 5C from the state illustrated in FIGS. 5A and 5B, when power is not applied to the coil 20a of the lock mechanism 20. In more detail, as shown in FIG. 5C, the plunger 20e contacts with the pedal main body 9a when power is not applied to the coil 20a of the lock mechanism 20. As a result, the pedal main body 9a cannot move to a lower side in FIG. 5C. That is, when power is not applied to the coil 20a of the lock mechanism 20, the trigger input pedal 9 is brought into a state where the trigger input pedal 9 is locked by the lock mechanism 20.

FIGS. 6A and 6B are diagrams for explaining a state where a trigger is inputted via the trigger input pedal 9 of the vehicle 200 in the first embodiment and a state where the trigger is not inputted. In more detail, FIG. 6A illustrates a state where the trigger is inputted via the trigger input pedal 9 illustrated in FIG. 4A, and a state where the trigger is not inputted. FIG. 6B illustrates a state where the trigger is inputted via the trigger input pedal 9 illustrated in FIGS. 5A to 5C, and a state where the trigger is not inputted. In an example illustrated in FIG. 6A, the pedal main body 9a (refer to FIG. 4A) of the trigger input pedal 9 (refer to FIG. 4A) is not pressed by the driver before a time point t1. As a result, a state where the trigger is not inputted is brought about. Next, at the time point t1, the pedal main body 9a is pressed by the left foot of the driver, and the pedal main body 9a and the arm 9b (refer to FIG. 4A) are brought into a state where the pedal main body 9a and the arm 9b are rotated in a clockwise direction in FIG. 4A. As a result, during a period from t1 to t2, a state where the trigger is inputted is brought about. At a time point t2, the pedal main body 9a is pressed again by the left foot of the driver, and thereby the motor 9c (refer to FIG. 4A) is driven so as to rotate the pedal main body 9a and the arm 9b in the counterclockwise direction in FIG. 4A. As a result, during a period from t2 to t3, a state where the trigger is not inputted is brought about. At a time period t3, the pedal main body 9a is pressed once more. Then, the pedal main body 9a and the arm 9b rotates in the clockwise direction in FIG. 4A. As a result, after the time point t3, a state where the trigger is inputted is brought about.

In the example illustrated in FIG. 6A, the trigger input pedal 9 (refer to FIG. 4A) acts as a toggle switch. Thus, it is necessary to push the pedal main body 9a at the time point t2 in order to rotate it in the counterclockwise direction in FIG. 4A. However, in another example, the action of pressing the pedal main body 9a is not needed. The motor 9c may be driven at the time point t2 so as to rotate the pedal main body 9a in the counterclockwise direction in FIG. 4A, instead. Alternatively, in still another example, the pedal main body 9a is pressed at the time point t1 so as to obtain the state where the trigger is inputted. In this example, when pressing on the pedal main body 9a is cancelled, the pedal main body 9a and the arm 9b are rotated in the counterclockwise direction in FIG. 4A by the motor 9c, but the state where the trigger is inputted is kept until the pedal main body 9a is pressed again at t2. As a result, during the period from t1 to t2, the state where the trigger is inputted is brought about.

In the example illustrated in FIG. 6B, before a time point t11, the pedal main body 9a (refer to FIGS. 5A to 5C) of the trigger input pedal 9 (refer to FIGS. 5A to 5C) is not pressed by the driver. As a result, a state where the trigger is not inputted is brought about. At a time point t12, the pedal main body 9a is pressed by the driver so as to input the trigger. When pressing on the pedal main body 9a is cancelled at a time point t13, the pedal main body 9a is returned from the position illustrated in FIG. 5B to the position illustrated in FIG. 5A by the spring 9d (refer to FIGS. 5A to 5C). As a result, during a period from t13 to t14, a state where the trigger is not inputted is brought about. Next, at a time point t15, the pedal main body 9a is pressed so as to input the trigger. When pressing on the pedal main body 9a is cancelled at a time point t16, the trigger is also cancelled. Then, the stated is kept during a period from t16 to t17. At a time point t17, the pedal main body 9a is pressed again so as to input the trigger. Pressing on the pedal main body 9a is kept to a time point t18, whereby the trigger is continuously inputted during a period from t17 to t18. When pressing on the pedal main body 9a is cancelled at the time point t18, a state where the trigger is not inputted is brought about.

In the example illustrated in FIG. 1, the auxiliary equipment 50 is ordinarily operated by the driver of the vehicle 200. The auxiliary equipment 50 includes various devices that are not defined as the actuator 6. In the example illustrated in FIG. 1, the auxiliary equipment 50 includes, for example, a traffic indicator lamp, a head lamp, a wiper and the like.

In the example illustrated in FIG. 1, the ECU 10 executes autonomous drive control for the vehicle 200. The ECU 10 has a CPU (Central Processing Unit), a ROM (Read Only Memory), a RAM (Random Access Memory) and the like. In the example illustrated in FIG. 1, the ECU 10 has an acquisition section 11, a recognition section 12, a travel plan generation section 13, a calculation section 14, a display section 15 and the control section 16. In the ECU 10, control in the acquisition section 11 and the like is executed by loading a program stored in the ROM to the RAM, and executing the program in the CPU. The ECU 10 may be configured by a plurality of electronic control units. In the example illustrated in FIG. 1, the ECU 10 functions as a self-position estimation section that estimates a self-position of the vehicle 200 based on the positional information of the vehicle 200 that is acquired by the GPS receiving section 2 and the map information of the map database 4.

In the example illustrated in FIG. 1, the acquisition section 11 acquires followings based on the information acquired by the internal sensor 3: (1) operation amounts of a steering operation, an accelerator operation and a brake operation by the driver of the vehicle 200 under the autonomous drive control (the operation amounts also include the above described steering workload); and (2) operation amounts of a steering operation, an accelerator operation and a brake operation by the driver of the vehicle 200 in manual drive (the operation amounts also include the above described steering workload). The operation amounts are, for example, a steering angle of the steering wheel, steering torque to the steering wheel, a steering workload, the pressing amount on the accelerator pedal 101, the pressing amount on the brake pedal 102, the operation force to the brake pedal 102 and the like. Alternatively, the operation amount for each of the steering angle of the steering wheel, the steering torque to the steering wheel, the steering workload, the pressing amount on the accelerator pedal 101, the pressing amount on the brake pedal 102, the operation force on the brake pedal 102 and the like may be a continuous time during which each of them are equal to or more than a threshold value that are preset beforehand for each of them, respectively.

In the example illustrated in FIG. 1, the recognition section 12 recognizes an environment around the vehicle 200 based on the information acquired from the external sensor 1, the GPS receiving section 2 and the map database 4. The recognition section 12 has an obstacle recognition section (not illustrated), a road width recognition section (not illustrated) and a facility recognition section (not illustrated), for example. The obstacle recognition section recognizes obstacles around the vehicle 200 as the environment around the vehicle 200, based on the information acquired by the external sensor 1. The obstacles recognized by the obstacle recognition section include, for example, moving objects such as pedestrians, other vehicles, motorcycles and bicycles, as well as stationary objects such as traffic lane lines (white lines, yellow lines) on roads, curbs, guardrails, poles, medial strips, buildings and trees. The obstacle recognition section acquires information concerning a distance between an obstacle and the vehicle 200, a position of the obstacle, a direction of the obstacle relative to the vehicle 200, a relative speed, a relative acceleration, and a category and an attribute of the obstacle. The category of the obstacle includes a pedestrian, other vehicles, a moving objects, a stationary objects and the like. The attributes of the obstacle refers to properties of the obstacle, such as hardness and a shape of the obstacle.

The road width recognition section recognizes a road width of the road on which the vehicle 200 travels, as the environment around the vehicle 200, based on the information acquired from the external sensor 1, the GPS receiving section 2 and the map database 4. The facility recognition section recognizes whether or not the vehicle 200 travels in either an intersection or a parking lot, as the environment around the vehicle 200, based on the map information acquired from the map database 4 and the positional information of the vehicle 200 which is acquired by the GPS receiving section 2. The facility recognition section may recognize whether or not the vehicle 200 travels on a street for students going to and from school, near a childcare facility, near a school, near a park and the like, as the environment around the vehicle 200, based on the map information and the positional information of the vehicle 200. In the example illustrated in FIG. 1, the recognition section 12 functions as an object recognition section.

In the example illustrated in FIG. 1, the travel plan generation section 13 generates a travel plan of the vehicle 200 based on the target route calculated in the navigation system 5, the information concerning the obstacles around the vehicle 200 which are recognized by the recognition section 12, and the map information acquired from the map database 4. The travel plan accords with a track in which the vehicle 200 trips along the target route. The travel plan includes, speeds, accelerations, decelerations, positions, directions, steering angles and the like of the vehicle 200 at respective time points. The travel plan generation section 13 generates such a travel plan that the vehicle 200 performs travel that satisfies standards of safety, compliance, travel efficiency and the like on the target route. Further, the travel plan generation section 13 generates the travel plan of the vehicle 200 to avoid contact with the obstacles based on the situation of the obstacles around the vehicle 200. In the example illustrated in FIG. 1, the travel plan generation section 13 functions as a track generation section that generates a travel track of the vehicle 200, based on a self-position estimation result by the ECU 10 which functions as a self-position estimation section as well as an object recognition result by the recognition section 12 that functions as the object recognition section. Further, in the example illustrated in FIG. 1, the actuator 6 has a function of moving the vehicle 200 so that the vehicle 200 travels along the travel track that is generated by the track generation section.

In the example illustrated in FIG. 1, the calculation section 14 calculates a threshold value that are used for determining whether or not to switch to the manual drive from the autonomous drive control. The threshold value is calculated based on the operation amounts of the driver acquired by the acquisition section 11 during the autonomous drive control. The operation amount also includes the above described steering workload. Further, the calculation section 14 calculates a threshold value that is used for determining whether or not the autonomous drive control can be started. The determination is executed in an autonomous drive control start possibility determination section 16g of the control section 16 (hereinafter, referred to "ADC start possibility determination section 16g". The threshold value is calculated based on the operation amounts of the driver during the manual drive. The operation amounts are acquired by the acquisition section 11. The operation amounts also include the above described steering workload.

For example, the ECU 10 stores a function about the threshold values for the switching to the manual drive from the autonomous drive control and the operation amounts of the driver, which include the above described steering workload. The function is used in calculation of the threshold value for the switching to the manual drive from the autonomous drive control in the calculation section 14. Further, for example, the ECU 10 stores a function about the threshold values that are used in the ADC start possibility determination section 16g of the control section 16, and the operation amounts of the driver, which also include the above described steering workload. The function is used in calculation of the threshold value for the start possibility in the calculation section 14.

In the example illustrated in FIG. 1, for example, the display section 15 displays on a display of the HMI 7 the threshold value to be used in determination of whether or not to switch to the manual drive from the autonomous drive control, which is calculated by the calculation section 14. More specifically, the threshold value that is used in determination of whether or not to switch to the manual drive from the autonomous drive control may be displayed during the autonomous drive control, for example on the display section 15. Further, in the example illustrated in FIG. 1, the display section 15 may display the threshold value which is calculated by the calculation section 14 and is used in determination of whether or not start of the autonomous drive control is possible, for example on the display of the HMI 7. More specifically, the threshold value that is used in determination of whether or not start of the autonomous drive control is possible is displayed, for example by the display section 15 during the manual drive.

In the example illustrated in FIG. 1, the control section 16 automatically controls travel of the vehicle 200 based on the travel plan generated by the travel plan generation section 13. The control section 16 outputs a control signal corresponding to the travel plan to the actuator 6. That is, the control section 16 controls the actuator 6 based on the travel plan, whereby the autonomous drive control of the vehicle 200 is executed. Further, when the operation amounts (the operation amounts also include the aforementioned steering workload) of the driver that is acquired by the acquisition section 11 becomes equal to or more than the threshold value that is calculated by the calculation section 14 during execution of the autonomous drive control of the vehicle 200, the control section 16 switches to the manual drive from the autonomous drive control.

In the example illustrated in FIG. 1, as described above, the control section 16 is provided with the ADC start possibility determination section 16g that determines whether or not start of the autonomous drive control is possible by the autonomous driving device 100. The ADC start possibility determination section 16g determines as follows based on information separate from intention of the driver, for example.

For example, the ADC start possibility determination section 16g determines whether or not start of the autonomous drive control is possible based on a deviation between the position of the vehicle 200 that is calculated from the signal received by the GPS receiving section 2, and an actual position of the vehicle 200 that is calculated from the output signal from the external sensor 1, the map information of the map database 4 and the like. When the deviation is large, it is determined that start of the autonomous drive control is impossible by the ADC start possibility determination section 16g.

For example, the ADC start possibility determination section 16g determines whether or not start of the autonomous drive control is possible based on the curvature of the road on which the vehicle 200 is traveling. As the curvature becomes larger, the aforementioned deviation becomes apt to be larger. When the aforementioned deviation is large, the ADC start possibility determination section 16g determines that start of the autonomous drive control is impossible.

For example, when an autonomous travel zone is set in the map information of the map database 4, the ADC start possibility determination section 16g determines that start of the autonomous drive control is possible when it is estimated that the self-position of the vehicle 200 reaches the autonomous travel zone, based on the positional information of the vehicle 200 that is acquired by the GPS receiving section 2, and the map information of the map database 4.

For example, when the number of obstacles around the vehicle 200 is small, and the weather is fine, the ADC start possibility determination section 16g determines that start of the autonomous drive control is possible, since reliability of object recognition by the recognition section 12 can be judged to be high.

For example, when the vehicle 200 enters into the autonomous travel zone, a sign or the like that indicates the autonomous travel zone may be recognized by the recognition section 12. The ADC start possibility determination section 16g determines that start of the autonomous drive control is possible when the recognition section 12 recognizes such a sigh or the like.

In the example illustrated in FIG. 1, the switching determination section 16h in the control section 16 determines presence or absence of the trigger to stop the autonomous drive control. The switching determination section 16h executes the following determinations, based on operations that are performed by a driver with his or her own intention, for example.

For example, the switching determination section 16h determines whether or not to switch to the manual drive from the autonomous drive control, based on the operation amount (which also includes the above described steering workload) of steering of the driver of the vehicle 200 that is acquired by the acquisition section 11 during the autonomous drive control.

For example, the switching determination section 16h determines whether or not to switch to the manual drive from the autonomous drive control based on the operation amount of the accelerator or the brake by the driver of the vehicle 200 acquired by the acquisition section 11 during the autonomous drive control.

In the example illustrated in FIG. 1, it is displayed on the display or the like of the HMI 7, for example, by the display section 15 that the autonomous drive control is executed, when the autonomous drive control is started. When switching to the manual drive from the autonomous drive control is executed, it is displayed that the autonomous drive control is not executed (that is, that the manual drive is executed), for example, on the display of the HMI 7 by the display section 15.

In the example illustrated in FIG. 1, the trigger input pedal 9 functions as an autonomous drive control start trigger input pedal, as well as an autonomous drive control end trigger input pedal. Whether or not to start the autonomous drive control is determined by the autonomous drive control start determination section 16a of the control section 16 (hereinafter, referred to as "ADC start determination section 16a"). Whether or not to end the autonomous drive control is determined by an autonomous drive control end determination section 16b of the control section 16 (hereinafter, referred to as "ADC end determination section 16b").

In the example illustrated in FIG. 1, a state of the driver is estimated by a driver state estimation section 16c of the control section 16, based on an output signal from the monitor device 8. The driver state estimation section 16c estimates a prepared condition of the driver for starting the autonomous drive control, and a prepared condition of the driver for ending the autonomous drive control, based on the output signal from the monitor device 8.

More specifically, when a camera capable of picking up an image of the driver is used as the monitor device 8 for example, the eye opening degree, the sight line direction, the posture, the seating position and the like of the driver are estimated by the driver state estimation section 16*c*, for example. For example, when a touch sensor that detects strength of the force with which the steering wheel is gripped is used as the monitor device 8, the driver state estimation section 16*c* estimates that the driver grips the steering wheel when a detection value is large.

In a case where a seating sensor that detects the body pressure distribution on a seat face portion of the driver is used as the monitor device 8 for example, the driver state estimation section 16*c* estimates that the driver is properly seated when an imbalance in the body pressure distribution on the seat face portion of the driver is small.

Alternatively, in a case where when the seating sensor that detects the body pressure distribution on the seat face portion of the driver is used as the monitor device 8 for example, the driver state estimation section 16*c* estimates that the driver is properly seated when the body pressure distribution detected by the seating sensor has a correlation with a body pressure distribution that is set in advance as the body pressure distribution at the time of the driver being properly seated.

In a case where the seating sensor that detects a body pressure distribution on a back face portion of the driver is used as the monitor device 8 for example, the driver state estimation section 16*c* estimates that the driver is properly seated when an imbalance in the body pressure distribution on the back face portion of the driver is small.

Alternatively, in a case where the seating sensor that detects the body pressure distribution on the back face portion of the driver is used as the monitor device 8 for example, the driver state estimation section 16*c* estimates that the driver is properly seated when a body pressure distribution on a portion where shoulder blades of the driver contact with is large.

In another example, the respective examples of the driver state estimation section 16*c* described above can be also combined properly.

Further, the driver state estimation section 16*c* can also estimate that the driver is properly seated, when a value of the suitable body pressure distribution or the like that is detected by the monitor device 8 continues for a predetermined time period.

In the example illustrated in FIG. 1, based on the estimation result of the driver state estimation section 16*c*, a driver state determination section 16*d* determines whether or not the state of the driver is suitable for start of the autonomous drive control, and whether or not the state of the driver is suitable for end of the autonomous drive control. More specifically, when the driver state estimation section 16*c* estimates that the driver is properly seated, and the driver is carefully watching ahead during execution of the manual drive, for example, the driver state determination section 16*d* determines that the state of the driver is suitable for start of the autonomous drive control, that is, the driver is well prepared for starting the autonomous drive control is made. Further, when the driver state estimation section 16*c* estimates that the driver is properly seated, and the driver is carefully watching ahead during execution of the autonomous drive control, for example, the driver state determination section 16*d* determines that the state of the driver is suitable for end of the autonomous drive control, that is, the driver is well prepared for ending the autonomous drive control is made.

In the example illustrated in FIG. 1, the driver can execute a steering operation, an accelerator operation and a brake operation during the autonomous drive control, as described above. It should be noted that the vehicle 200 may travel on a road where the vehicle 200 easily falls into a spin during the autonomous drive control. In some cases, the driver may requires a steering intervention which does not accord with the instruction of the autonomous drive control under a situation where the vehicle 200 travels on such a road on which the vehicle easily falls into a spin. If the steering intervention by the driver is permitted in such a situation, the risk of the vehicle 200 falling into a spin becomes higher than in a case where the steering intervention by the driver is rejected and the autonomous drive control is continued. In more detail, the risk of the vehicle 200 spinning out becomes high, immediately after the steering intervention by the driver is permitted and the driver starts a steering operation. In the light of this point, in the example illustrated in FIG. 1, the driver state estimation section 16*c* estimates a steering intervention of the driver in the autonomous drive control. Further, a risk estimation section 16*f* estimates a risk that is caused by a steering intervention of the driver in the autonomous drive control. More specifically, in the example illustrated in FIG. 1, in a case where the travel track of the vehicle 200 is generated by the travel plan generation section 13 that functions as the track generation section, the travel track of the vehicle 200 after several seconds is predicted, and the recognition section 12 that functions as the object recognition section predicts the state of obstacles around the vehicle 200 after several seconds. When the travel track of the vehicle 200 is generated by the travel plan generation section 13, a parameter of the steering angle is made variable, and thereby travel tracks of the vehicle 200 corresponding to the respective steering angles are estimated. Further, it is estimated whether or not the vehicle 200 on each of the travel tracks approaches the surrounding obstacles. During execution of the autonomous drive control, estimation of the travel track of the vehicle 200 corresponding to each of the steering angles, and estimation of whether the vehicle 200 on each of the travel tracks approaches the surrounding obstacles are continuously executed. When a steering intervention of the driver takes place during execution of the autonomous drive control, estimation of the travel track of the vehicle 200 corresponding to a steering angle corresponding to the steering intervention of the driver, and estimation of whether or not the vehicle 200 on the travel track approaches the surrounding obstacles are executed, and based on results of the estimations, the risk estimation section 16*f* estimates the risk that is caused by the steering intervention of the driver in the autonomous drive control.

Figure 2:
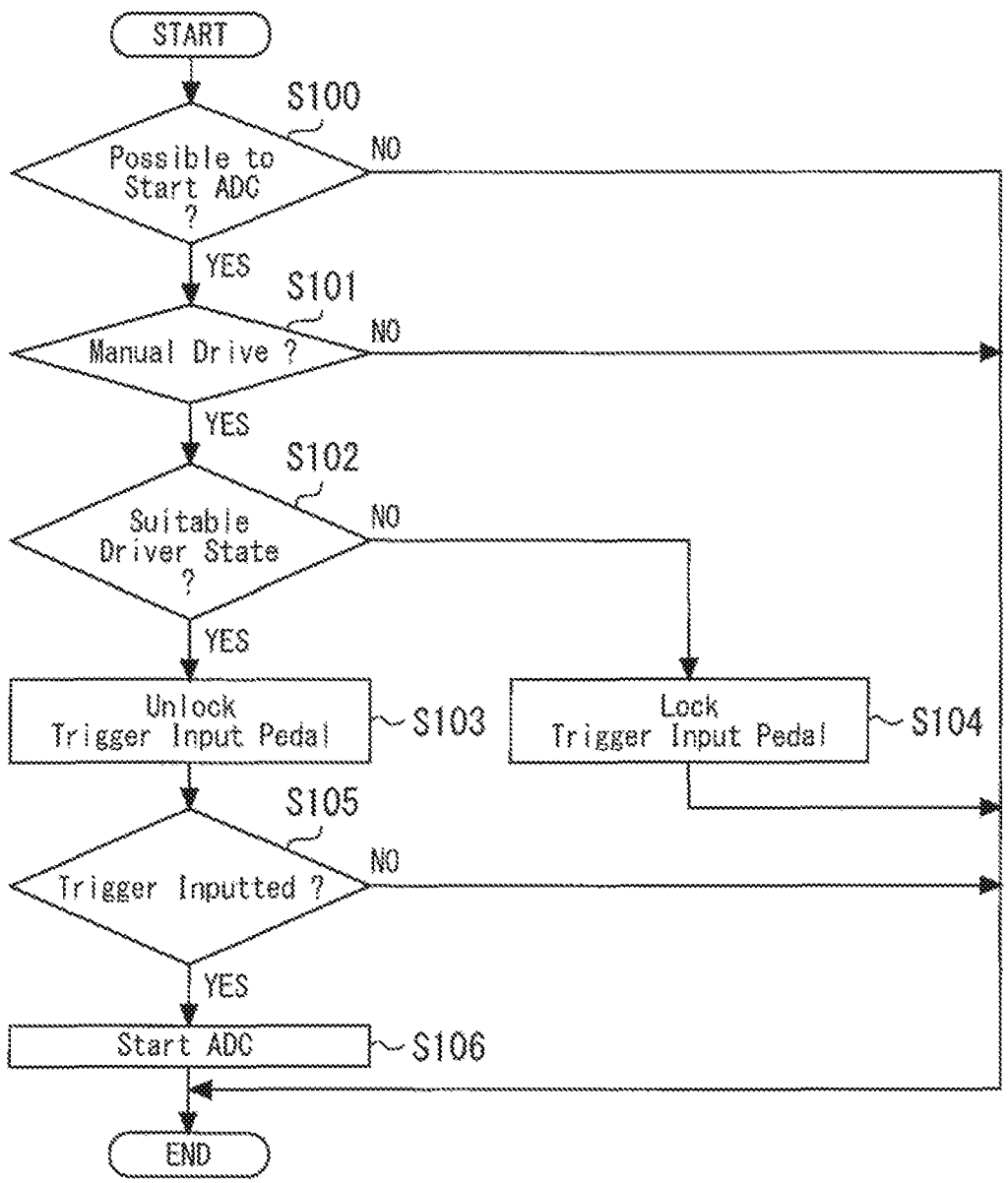
FIG. 2 is a flowchart for explaining a start of the autonomous drive control in the vehicle 200 according to the first embodiment of the present disclosure.

FIG. 2 is a flowchart for explaining start of the autonomous drive control in the vehicle 200 in the first embodiment. When a routine illustrated in FIG. 2 is started, first of all, in step S100, it is determined whether or not start of the autonomous drive control is possible by the ADC start possibility determination section 16*g* (refer to FIG. 1). When it is determined as YES, the flow goes to step S101, and when it is determines as NO, the routine is ended. When it is determined as YES, the display section 15 (refer to FIG. 1) may inform to the driver the fact that the autonomous drive control is possible.

In step S101, it is determined whether or not the manual drive is under execution by the control section 16 (refer to FIG. 1), for example. When it is determined as YES, the flow goes to step S102, and when it is determined as NO, the routine is ended.

In step S102, it is determined whether or not the state of the driver is suitable for start of the autonomous drive control by the driver state determination section 16d (refer to FIG. 1). When it is determined as YES, the flow goes to step S103, and when it is determined as NO, the flow goes to step S104.

In step S103, a value of a pedal reaction force of the trigger input pedal 9 (refer to FIGS. 1, 4A, and 5A to 5C) is set at zero, for example, by a pedal reaction force setting section 16e (refer to FIG. 1). As a result, lock on the trigger input pedal 9 by the lock mechanism 20 (refer to FIGS. 1, 4B and 5A to 5C) is cancelled. Thereby, there arises a state in which the driver can input the autonomous drive control start trigger via the trigger input pedal 9. Next, the flow goes to step S105.

In step S104, the pedal reaction force of the trigger input pedal 9 is set at a large value by the pedal reaction force setting section 16e. As a result, the trigger input pedal 9 is locked by the lock mechanism 20, and there arises a state in which the driver cannot input the autonomous drive control start trigger via the trigger input pedal 9.

In step S105, it is determined whether or not the autonomous drive control start trigger is inputted via the trigger input pedal 9 (refer to FIG. 1) by the driver, by the ADC start determination section 16a (refer to FIG. 1), for example. When it is determined as YES, the flow goes to step S106, and when it is determined as NO, the routine is ended.

In step S106, the autonomous drive control is started by the ADC start determination section 16a.

That is, as described above, in the vehicle 200 of the first embodiment, the autonomous drive control start trigger is not inputted via the autonomous drive start button by the hand of the driver performing the steering operation under the manual drive as in the vehicle described in Patent Literature 1, but the autonomous drive control start trigger is inputted via the trigger input pedal 9 (refer to FIG. 1, FIG. 4A and FIGS. 5A to 5C) by the left foot of the driver that does not participate in any of the steering operation, the accelerator operation and the brake operation under the manual drive. Consequently, in the vehicle 200 of the first embodiment, a disturbance in the steering operation at the time of inputting the autonomous drive control start trigger can be suppressed more than in a case where the autonomous drive control start trigger is inputted by the hand of the driver performing the steering operation under the manual drive, and a disturbance in the accelerator operation or the brake operation at the time of inputting the autonomous drive control start trigger can be suppressed more than in a case where the autonomous drive control start trigger is inputted by a right foot of the driver performing the accelerator operation or the brake operation under the manual drive. As a result, the vehicle 200 in the first embodiment can suppress the disturbance in the behavior of the vehicle 200, which is caused by a disturbance in the steering operation, the accelerator operation or the brake operation at the time of inputting the autonomous drive control start trigger. In other words, in the vehicle 200 of the first embodiment, the autonomous drive control can be started without disturbing the behavior of the vehicle 200, even when the steering operation and the accelerator operation or the brake operation are carried out by the driver.

It may occur that the autonomous drive control start trigger is inputted via the trigger input pedal 9 (refer to FIGS. 1, 4A and 5A to 5C) by an erroneous operation of the driver during manual drive, although the driver desires continuation of the manual drive. It is not preferable that the autonomous drive control is started by the erroneous operation, because a switching operation from the autonomous drive control to manual drive becomes necessary to perform for the driver. From the view point of the above, the vehicle 200 of the first embodiment does not start the autonomous drive control, unless the driver state determination section 16d (refer to FIG. 1) determines that the state of the driver is suitable for start of the autonomous drive control, even when the ADC start possibility determination section 16g (refer to FIG. 1) determines that start of the autonomous drive control is possible, and the autonomous drive control star trigger is inputted by the driver. Consequently, the vehicle 200 of the first embodiment can reduce the possibility that the autonomous drive control is started when the autonomous drive control start trigger is inputted by mistake. In other words, the vehicle 200 of the first embodiment can realize a switching between the autonomous drive control and the manual drive so that the desire of the driver is reflected to it.

Further, in the vehicle 200 of the first embodiment, the trigger input pedal 9 (refer to FIGS. 1, 4A and 5A to 5C) is locked when the state of the driver is not suitable for start of the autonomous drive control. Consequently, in the vehicle 200 of the first embodiment, it is possible to notify the driver that the driver state determination section 16d (refer to FIG. 1) determines that the state of the driver is not suitable for start of the autonomous drive control by the trigger input pedal 9 being locked.

Figure 3:
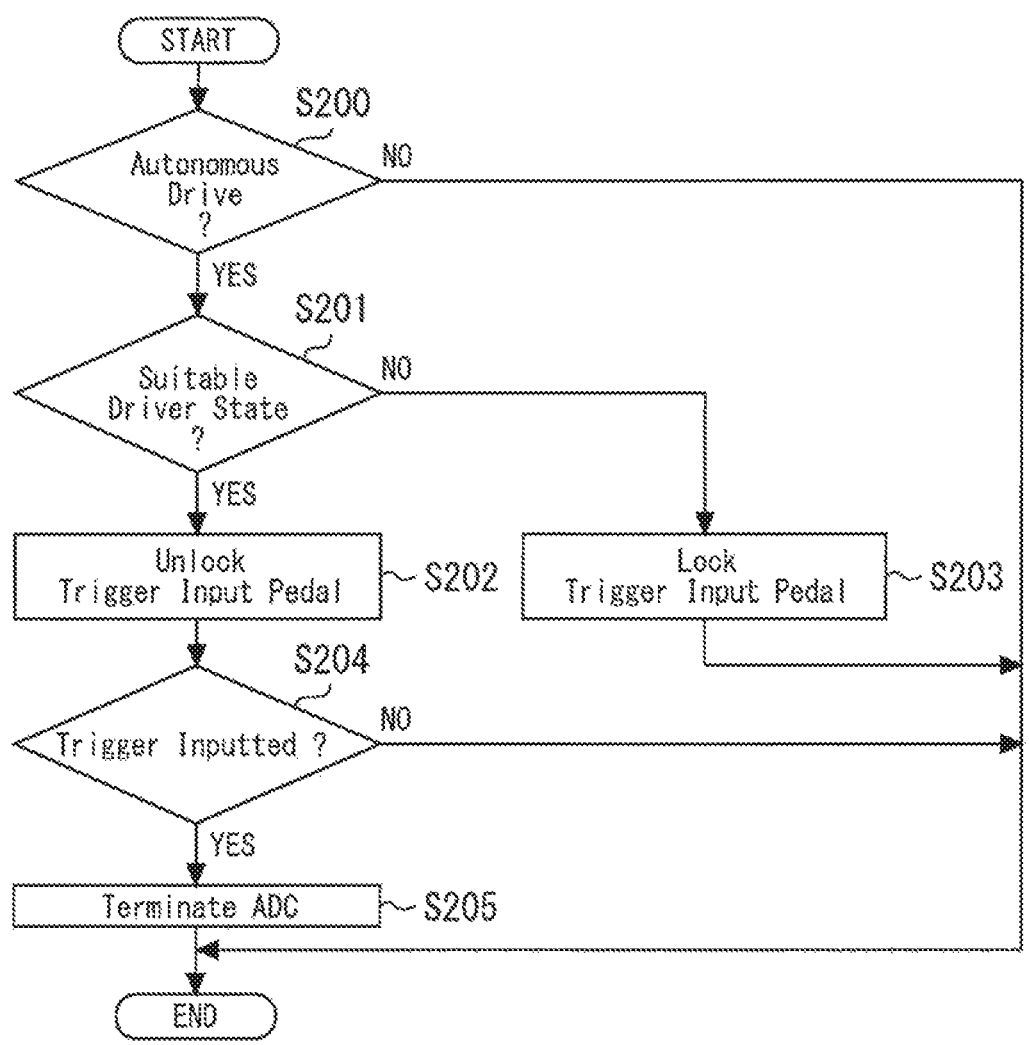
FIG. 3 is a flowchart for explaining a termination of the autonomous drive control in the vehicle 200 according to the first embodiment of the present disclosure.

FIG. 3 is a flowchart for explaining end of the autonomous drive control in the vehicle 200 of the first embodiment. When the routine illustrated in FIG. 3 is started, first of all in step S200, it is determined whether or not the autonomous drive control is under execution by the control section 16 (refer to FIG. 1), for example. When it is determined as YES, the flow goes to step S201, and when it is determined as NO, the routine is ended.

In step S201, it is determined whether or not the state of the driver is suitable for end of the autonomous drive control by the driver state determination section 16d (refer to FIG. 1). When it is determined as YES, the flow goes to step S202, and when it is determined as NO, the flow goes to step S203.

In step S202, the value of the pedal reaction force of the trigger input pedal 9 (refer to FIGS. 1, 4A and 5A to 5C) is set at zero, for example, by the pedal reaction force setting section 16e (refer to FIG. 1). As a result, lock on the trigger input pedal 9 by the lock mechanism 20 (refer to FIGS. 1, 4B and 5A to 5C) is cancelled. Thereby, there arises a state in which the driver can input the autonomous drive control end trigger via the trigger input pedal 9. Next, the flow goes to step S204.

In step S203, the pedal reaction force of the trigger input pedal 9 is set at a large value by the pedal reaction force setting section 16e. As a result, the trigger input pedal 9 is locked by the lock mechanism 20, and there arises a state in which the driver cannot input the autonomous drive control end trigger via the trigger input pedal 9.

In step S204, it is determined whether or not the autonomous drive control end trigger is inputted via the trigger input pedal 9 (refer to FIG. 1) by the driver, by the ADC end determination section 16b (refer to FIG. 1). When it is determined as YES, the flow goes to step S205, and when it is determined as NO, the routine is ended.

In step S205, the autonomous drive control is ended by the ADC end determination section 16b.

That is, in the vehicle 200 of the first embodiment, the autonomous drive control end trigger is not inputted by the hand of the driver that should execute the steering operation immediately after end of the autonomous drive control (that is, immediately after start of manual drive), but the autonomous drive control end trigger is inputted via the trigger input pedal 9 (refer to FIG. 1, FIG. 4A and FIGS. 5A to 5C) by the left foot of the driver that has no relationship with any of the steering operation, the accelerator operation and the brake operation in the manual drive. Consequently, in the vehicle 200 of the first embodiment, a disturbance in the steering operation immediately after the start of the manual drive can be suppressed more than in a case where the autonomous drive control end trigger is inputted by the hand of the driver that should execute the steering operation immediately after the start of the manual drive. Further, a disturbance in the accelerator operation or the brake operation immediately after start of the manual drive can be suppressed more than in the case where the autonomous drive control end trigger is inputted by the right foot of the driver that should execute the accelerator operation or the brake operation immediately after the start of the manual drive. As a result, the vehicle 200 in the first embodiment can suppress the disturbance in the behavior of the vehicle 200, which is caused by disturbance in the steering operation, the accelerator operation or the brake operation immediately after the end of the autonomous drive control (that is, immediately after the start of the manual drive). In other words, in the vehicle 200 of the first embodiment, the driver can execute the steering operation as well as the accelerator operation or the brake operation without disturbing the behavior of the vehicle 200 immediately after the end of the autonomous drive control.

It may occur that the autonomous drive control end trigger is inputted via the trigger input pedal 9 (refer to FIGS. 1, 4A and 5A to 5C) by an erroneous operation of the driver during autonomous drive control, although the driver desires continuation of the autonomous drive control, that is, the driver does not desire start of manual drive. When the driver desires continuation of the autonomous drive control, there is a high possibility that the driver is not prepared to execute the manual drive. From the view point discussed above, in the vehicle 200 of the first embodiment, the autonomous drive control is not terminated, unless the driver state determination section 16d (refer to FIG. 1) determines that the state of the driver is suitable for end of the autonomous drive control, even when the autonomous drive control end trigger is inputted when the autonomous drive control is executed. Consequently, the vehicle 200 of the first embodiment can reduce the possibility that the autonomous drive control is terminated although the driver is not prepared to execute manual drive.

Further, in the vehicle 200 of the first embodiment, the trigger input pedal 9 (refer to FIGS. 1, 4A and 5A to 5C) is locked when the state of the driver is not suitable for end of the autonomous drive control. Consequently, in the vehicle 200 of the first embodiment, it is possible to notify the driver that the driver state determination section 16d (refer to FIG. 1) determines that the state of the driver is not suitable for end of the autonomous drive control by the trigger input pedal 9 being locked.

Furthermore, in the vehicle 200 of the first embodiment, the trigger input pedal 9 (refer to FIGS. 1, 4A and 5A to 5C) functions as an autonomous drive control start trigger input pedal and an autonomous drive control end trigger input pedal. Consequently, the vehicle 200 of the first embodiment can reduce cost of the entire vehicle 200 more than in a case where the autonomous drive control start trigger input pedal and the autonomous drive control end trigger input pedal are provided separately.

In the example illustrated in FIG. 1 to which the vehicle 200 of the first embodiment is applied, the risk estimation section 16f is provided in the control section 16, but in another example to which the vehicle 200 of the first embodiment is applied, the risk estimation section 16f can be also omitted, instead.

In the example illustrated in FIG. 1 to which the vehicle 200 of the first embodiment is applied, the pedal reaction force setting section 16e and the lock mechanism 20 are provided, but in another example in which the vehicle 200 of the first embodiment is applied, the pedal reaction force setting section 16e and the lock mechanism 20 can be also omitted, instead.

Hereinafter a second embodiment of the vehicle of the present disclosure will be described. The vehicle of the second embodiment is configured substantially identical with the vehicle of the above described first embodiment, except for a point that will be described later. Consequently, according to the vehicle of the second embodiment, a substantially similar effect to the effect of the vehicle of the first embodiment can be provided, except for the point that will be described later.

In the vehicle 200 of the first embodiment, the trigger input pedal 9 (refer to FIGS. 1, 4A and 5A to 5C) is not locked when the risk estimation section 16f (refer to FIG. 1) estimates that there is a risk that is caused by steering intervention of the driver in the autonomous drive control, as described above. In the vehicle 200 of the second embodiment, the trigger input pedal 9 is locked when the risk estimation section 16f estimates that there is the risk that is caused by steering intervention of the driver in the autonomous drive control, as will be described later.

Figure 7:
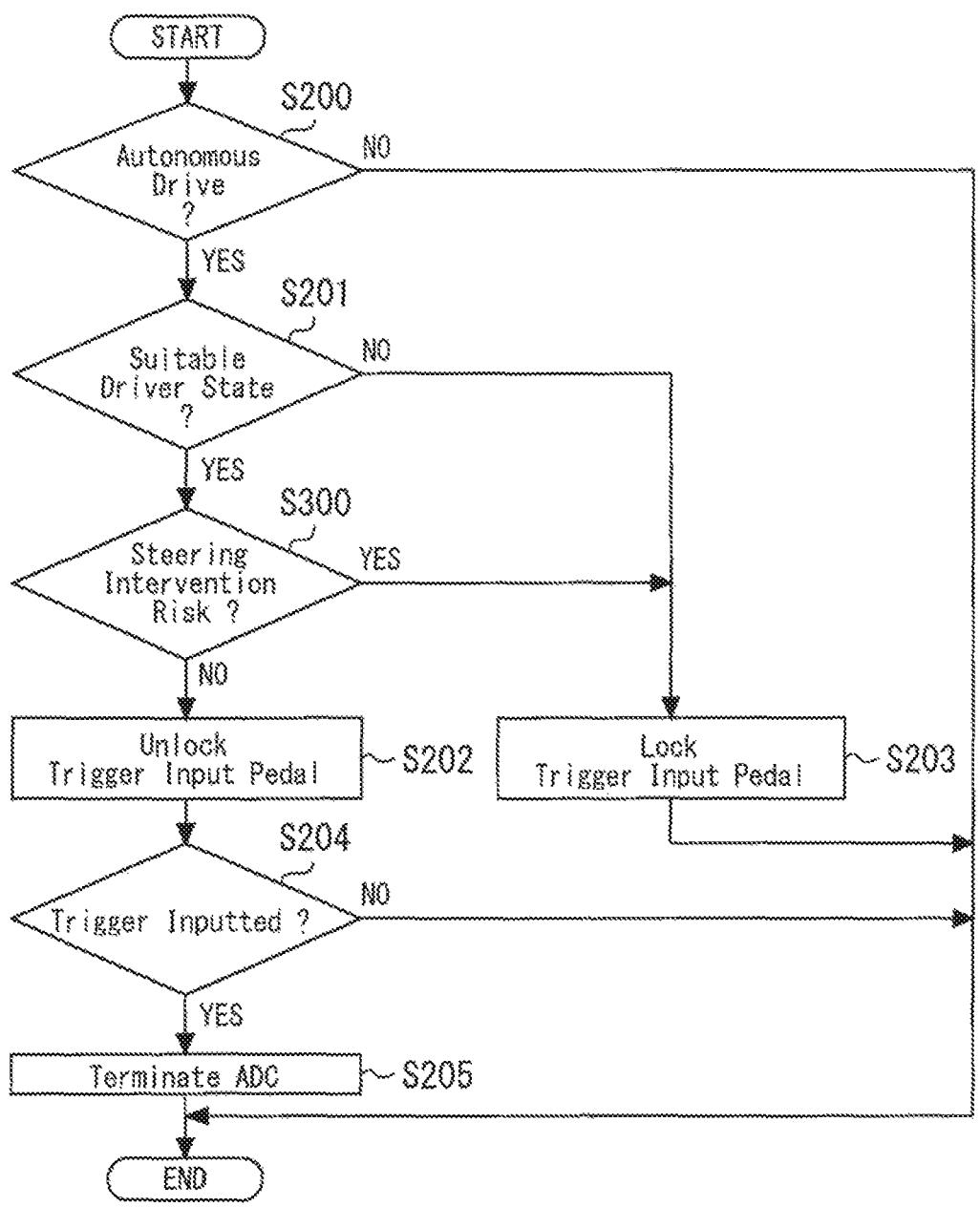
FIG. 7 is a flowchart for explaining a termination of an autonomous drive control in the vehicle 200 according to a second embodiment of the present disclosure.

FIG. 7 is a flowchart for explaining end of autonomous drive control in the vehicle 200 of the second embodiment. In FIG. 7, in steps that are similar to the steps illustrated in FIG. 3, processing similar to the processing that is executed in the steps illustrated in FIG. 3 is executed. When it is determined as YES in step S201, the flow goes to step S300, and when it is determined as NO in step S201, the flow goes to step S203.

In step S300, it is determined by the control section 16 (refer to FIG. 1), for example, whether or not the risk estimation section 16f (refer to FIG. 1) estimates that there is a risk which is caused by steering intervention of the driver in the autonomous drive control. When it is determined as YES, the flow goes to step S203, and when it is determined as NO, the flow goes to step S202.

That is, in the vehicle 200 of the second embodiment, when the risk estimation section 16f (refer to FIG. 1) estimates that there is the risk which is caused by steering intervention of the driver in the autonomous drive control, step S203 (refer to FIG. 7) is executed, and the trigger input pedal 9 (refer to FIGS. 1, 4A and 5A to 5C) is locked. Accordingly, in the vehicle 200 of the second embodiment, even when the driver desires steering intervention during the autonomous drive control, step S205 (refer to FIG. 7) is not executed so that a steering intervention by the driver is rejected and the autonomous drive control is continued, when the risk estimation section 16f estimates that there is the risk which is caused by steering intervention of the driver. Consequently, the vehicle 200 of the second embodiment can reduce the possibility that the risk caused by steering intervention of the driver occurs in autonomous drive control.

Further, in the vehicle 200 of the second embodiment, the trigger input pedal 9 is locked when the risk discussed above is acknowledged. Consequently, the second embodiment can notify the driver that there is the risk caused by steering intervention of the driver, i.e., the steering intervention of the driver is rejected by the autonomous driving device 100 (refer to FIG. 1) by the trigger input pedal 9 being locked.

In the example illustrated in FIG. 1, the pedal reaction force setting section 16e sets two values as the pedal reaction force for locking and unlocking the trigger input pedal 9. In another example to which the vehicle 200 of the second embodiment is applied, three or more values can be set as the pedal reaction force, the pedal reaction force can be set to be changeable linearly, or the pedal reaction force can be set to be changeable stepwise, instead. For example, the pedal reaction force may be decreased in accordance with a lapse of time from a state having the risk caused by steering intervention until a state without the risk, or in accordance with a travel distance of the vehicle 200. More specifically, the pedal reaction force is set at 100% when there is the risk caused by steering intervention of the driver in the autonomous drive control. Assuming that the risk will be vanished 10 seconds after the risk is acknowledged. The pedal reaction force after five seconds is set at 50%. Further, the pedal reaction force after 10 seconds is set at 0%. When the pedal reaction force is 100%, a permission degree of steering intervention of the driver corresponds to zero. When the pedal reaction force is 0%, the permission degree of the steering intervention of the driver corresponds to one. When the pedal reaction force is 50%, the permission degree of the steering intervention of the driver corresponds to 0.5. The driver can predict a timing at which the pedal reaction force becomes 0% and steering intervention of the driver is permitted, by feeling a change of the pedal reaction force of the trigger input pedal 9. The pedal reaction force of the trigger input pedal 9 can be made changeable from 0% to 100% by providing a device (not illustrated) that makes an shrinkage of a spring (not illustrated) for applying the pedal reaction force to the trigger input pedal 9 changeable between zero (that is, the spring is brought into a state of a natural length) and a predetermined value X, for example. When the shrinkage of the spring is set at a value 0.5X by the device, the pedal reaction force of the trigger input pedal 9 is set at 50%.

In a third embodiment of the vehicle of the present disclosure, the first and second embodiments and the respective examples of the vehicle of the present disclosure described above can be also combined properly.

What is claimed is:

1. A vehicle comprising an accelerator pedal, a brake pedal and an autonomous driving device that executes autonomous drive control of the vehicle, wherein the autonomous driving device comprises:
    a self-position estimation section;
    an object recognition section;
    a track generation section that generates a travel track of the vehicle based on an estimation result by the self-position estimation section and a recognition result by the object recognition section;
    an actuator that moves the vehicle so that the vehicle travels along the travel track generated by the track generation section;
    an autonomous drive control start trigger input pedal that is disposed at a left side from the accelerator pedal and the brake pedal, seen from a driver; and
    an autonomous drive control start determination section that starts the autonomous drive control when an autonomous drive control start trigger is inputted via the autonomous drive control start trigger input pedal by the driver under a situation where the autonomous driving device determines that start of the autonomous drive control is possible.

2. The vehicle according to claim 1, wherein the autonomous driving device further comprises:
    a driver state estimation section that estimates a state of the driver; and
    a driver state determination section that determines whether or not the state of the driver estimated by the driver state estimation section is suitable for start of the autonomous drive control, and wherein
    the autonomous drive control start determination section starts the autonomous drive control, when the driver state determination section determines that the state of the driver is suitable for start of the autonomous drive control and the autonomous drive control start trigger is inputted via the autonomous drive control start trigger input pedal by the driver, under a situation where the autonomous driving device determines that start of the autonomous drive control is possible.

3. The vehicle according to claim 2, wherein
    the autonomous driving device further comprises a lock mechanism that locks the autonomous drive control start trigger input pedal, and
    the lock mechanism locks the autonomous drive control start trigger input pedal so that the driver cannot input the autonomous drive control start trigger via the autonomous drive control start trigger input pedal when the driver state determination section determines that the state of the driver is not suitable for start of the autonomous drive control.

4. The vehicle according to claim 1, wherein
    the autonomous drive control start trigger input pedal also functions as an autonomous drive control end trigger input pedal, and
    the autonomous driving device further comprises an autonomous drive control end determination section that ends the autonomous drive control when the driver inputs an autonomous drive control end trigger via the autonomous drive control start trigger input pedal, under a situation where the autonomous drive control is executed by the autonomous driving device.

5. A vehicle comprising an accelerator pedal, a brake pedal and an autonomous driving device that executes autonomous drive control of the vehicle, wherein the autonomous driving device comprises:
    a self-position estimation section,
    an object recognition section,
    a track generation section that generates a travel track of the vehicle based on an estimation result by the self-position estimation section and a recognition result by the object recognition section,
    an actuator that moves the vehicle so that the vehicle travels along the travel track generated by the track generation section,
    an autonomous drive control end trigger input pedal that is disposed at a left side from the accelerator pedal and the brake pedal, seen from a driver, and an autonomous drive control end determination section that ends the autonomous drive control when an autonomous drive control end trigger is inputted via the autonomous drive control end trigger input pedal by the driver under a situation where the autonomous drive control is executed by the autonomous driving device.

6. The vehicle according to claim 5, wherein the autonomous driving device further comprises:

a driver state estimation section that estimates a state of the driver; and a driver state determination section that determines whether or not the state of the driver estimated by the driver state estimation section is suitable for end of the autonomous drive control, and wherein the autonomous drive control end determination section ends the autonomous drive control, when the driver state determination section determines that the state of the driver is suitable for end of the autonomous drive control and the autonomous drive control end trigger is inputted via the autonomous drive control end trigger input pedal by the driver, under a situation where the autonomous drive control is executed by the autonomous driving device.

7. The vehicle according to claim 6, wherein the autonomous driving device further comprises a lock mechanism that locks the autonomous drive control end trigger input pedal, and the lock mechanism locks the autonomous drive control end trigger input pedal so that the driver cannot input the autonomous drive control end trigger via the autonomous drive control end trigger input pedal when the driver state determination section determines that the state of the driver is not suitable for end of the autonomous drive control.

8. The vehicle according to claim 7, wherein the driver state estimation section estimates steering intervention of the driver in the autonomous drive control;

the autonomous driving device further comprises a risk estimation section that estimates a risk that is caused by steering intervention of the driver in the autonomous drive control; and the lock mechanism locks the autonomous drive control end trigger input pedal so that the driver cannot input the autonomous drive control end trigger via the autonomous drive control end trigger input pedal when the risk estimation section estimates that the risk is present.

* * * * *